(12) United States Patent
Sairam et al.

US011144943B2

(10) Patent No.: US 11,144,943 B2
(45) Date of Patent: Oct. 12, 2021

(54) DRAFT COMPLETION SYSTEM

(71) Applicant: eBay Inc., San Jose, CA (US)

(72) Inventors: Krithika Sairam, San Jose, CA (US); Rahul Kyamaji, San Jose, CA (US); Karunanidhi Sethuraman, San Jose, CA (US); Bhumika Gupta, Sunnyvale, CA (US); Paul Michael Taylor, Sunnyvale, CA (US); SasiKumar Arumugam, Campbell, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/230,140

(22) Filed: Dec. 21, 2018

(65) Prior Publication Data

US 2020/0202378 A1 Jun. 25, 2020

(51) Int. Cl.
*G06Q 30/02* (2012.01)
*G06Q 30/06* (2012.01)

(52) U.S. Cl.
CPC ..... *G06Q 30/0222* (2013.01); *G06Q 30/0208* (2013.01); *G06Q 30/0239* (2013.01); *G06Q 30/0641* (2013.01)

(58) Field of Classification Search
CPC . G06Q 30/02; G06Q 30/0222; G06Q 30/0208
See application file for complete search history.

(56) References Cited

U.S. PATENT DOCUMENTS

2008/0086429 A1* 4/2008 Venkatraman ....... G06Q 20/201
 705/400
2010/0312665 A1 12/2010 Bundy
2012/0173305 A1 7/2012 Bhaskaran
2013/0090998 A1* 4/2013 Shimogori ......... G06Q 30/0609
 705/14.23
2015/0058161 A1 2/2015 Gura et al.
(Continued)

FOREIGN PATENT DOCUMENTS

WO 2020/131775 A1 6/2020

OTHER PUBLICATIONS

Cruz-Benito et al., "Enabling Adaptability in Web Forms Based on User Characteristics Detection Through A/B Testing and Machine Learning" (published in IEEE Access, vol. 6, pp. 2251-2265, Dec. 27, 2017) (Year: 2017).*

(Continued)

*Primary Examiner* — Abhishek Vyas
*Assistant Examiner* — Patrick Kim
(74) *Attorney, Agent, or Firm* — Schwegman Lundberg & Woessner, P.A.

(57) ABSTRACT

Disclosed are systems, methods, and non-transitory computer-readable media for generating incentivizing notifications to complete an uncompleted listing. A draft completion system determines, based on data included in an uncompleted listing for an item, a set of status values for the uncompleted listing. The uncompleted listing os associated with a first account of an online service. The draft completion system determines, based on the set of status values, a first incentivizing notification for the uncompleted listing. The draft completion system presents, on a client device associated with the first account, a user interface including the first incentivizing notification and at least one user interface element that enables a user to complete the uncompleted listing.

15 Claims, 9 Drawing Sheets

(56) References Cited

U.S. PATENT DOCUMENTS

2016/0055010 A1* 2/2016 Baird .................... H04L 65/403
707/727
2016/0148273 A1* 5/2016 Ling, III ............... G06F 40/205
705/14.67

OTHER PUBLICATIONS

International search Report received for PCT Application No. PCT/US2019/066698, dated Apr. 16, 2020, 5 pages.
International Written Opinion received for PCT Application No. PCT/US2019/066698, dated Apr. 16, 2020, 7 pages.
International Preliminary Report on Patentability received for PCT Application No. PCT/US2019/066698, dated Jul. 1, 2021, 7 pages.

\* cited by examiner

DRAFT COMPLETION SYSTEM

TECHNICAL FIELD

An embodiment of the present subject matter relates generally to posting listings and, more specifically, to generating incentivizing notifications to complete an uncompleted listing.

BACKGROUND

Online marketplace services allow users to buy and sell items. For example, these services enable users to post listings for each item that the user wishes to sell, as well as view listings posted by other users. Many users, however, do not complete the process of posting a listing for sale. That is, a user may begin creating a listing, but does not complete the process for one or more reasons. For example, the user may feel that the process takes too long, the potential profit is not worth the trouble of completing the listing, the user does not have required information at hand, or the user may simply forget to finish the process. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for generating incentivizing notifications to complete an uncompleted listing. To encourage a user to complete a listing, a draft completion system presents users with incentivizing notifications that notify a user of a determined incentivizing reason for completing the listing. For example, the incentivizing notification may notify the user that the listing is almost ready to be posted (e.g., only a few pieces of information need to be added), that the listing is ready to be posted (e.g., a sufficient amount of information has been provided), an expected amount to be earned from sale of the item, that the item is currently in high demand and will likely sell quickly, that the listing is associated with a current promotion, and the like. The incentivizing notification may be presented in a user interface window that allows the user to easily and quickly complete the uncompleted listing. For example, the user interface window may include text fields that allow the user to provide any information that is needed to complete the listing and/or a button that allows the user to post the listing. The user can complete the listing without having to navigate to another webpage, thereby increasing the likelihood that the user will complete the listing.

Figure 1:
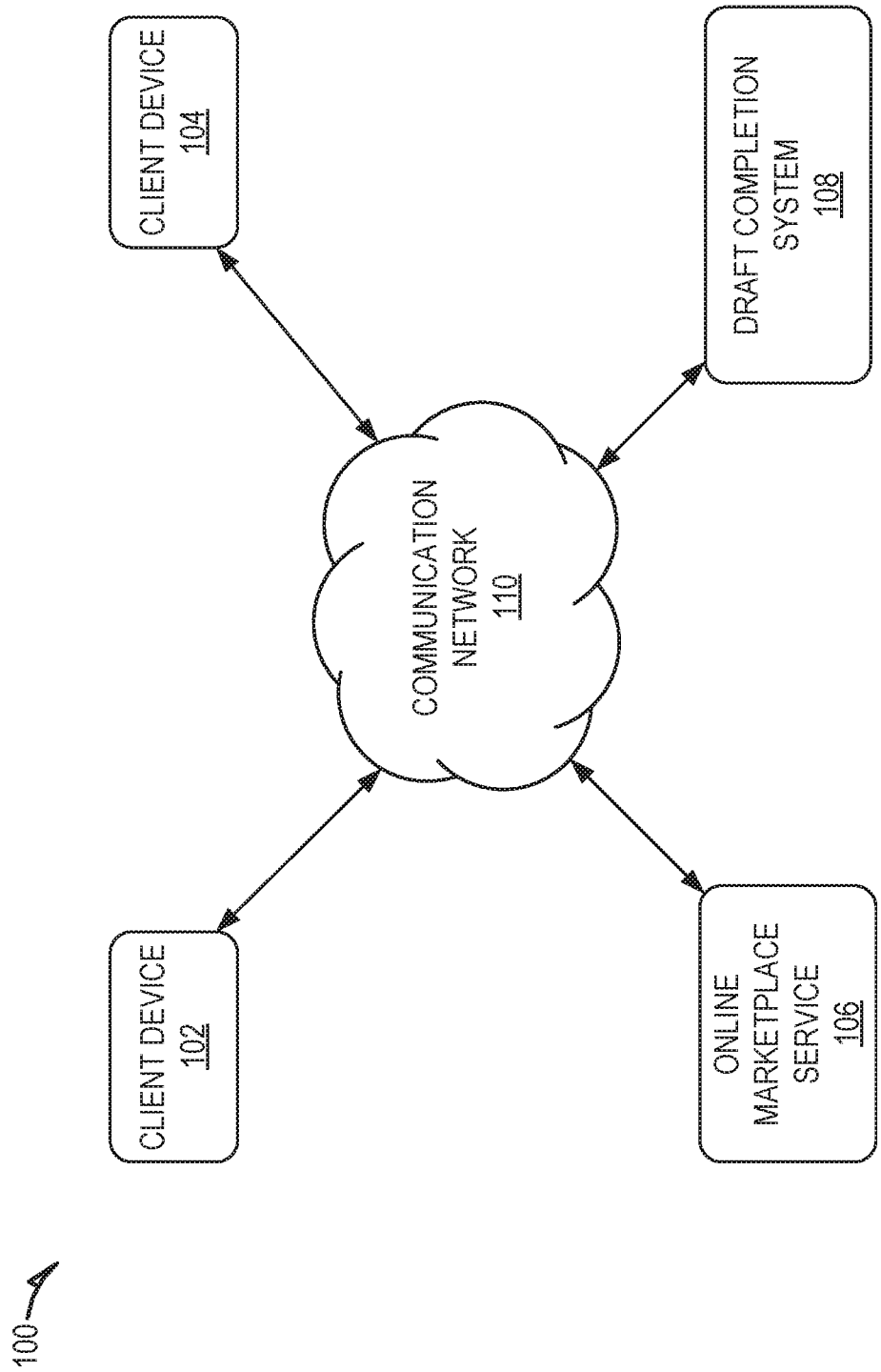
FIG. 1 shows an example system configuration, wherein electronic devices communicate via a network for purposes of exchanging content and other data.

FIG. 1 shows an example system 100, wherein electronic devices communicate via a network for purposes of exchanging content and other data. As shown, multiple devices (i.e., client device 102, client device 104, online marketplace service 106, and draft completion system 108) are connected to a communication network 110 and configured to communicate with each other through use of the communication network 110. The communication network 110 is any type of network, including a local area network (LAN), such as an intranet, a wide area network (WAN), such as the internet, or any combination thereof. Further, the communication network 110 may be a public network, a private network, or a combination thereof. The communication network 110 is implemented using any number of communication links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 600 shown in FIG. 6.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users interact with the online service 106 to utilize the services provided by the online marketplace service 106. The online marketplace service 106 provides an online marketplace in which users may post items for sale and purchase items posted for sale by other users. For example, the online marketplace service 160 may include items being auctioned for sale and/or items listed for sale at a set price. Users communicate with and utilize the functionality of the online marketplace service 106 by using the client devices 102 and 104 that are connected to the communication network 110 by direct and/or indirect communication.

Although the shown system 100 includes only two client devices 102, 104, this is only for ease of explanation and is not meant to be limiting. One skilled in the art would appreciate that the system 100 can include any number of client devices 102, 104. Further, the online marketplace service 106 may concurrently accept connections from and interact with any number of client devices 102, 104. The online marketplace service 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with the online marketplace service 106 via a client-side application installed on the client devices 102 and 104. In some embodiments, the client-side application includes a component specific to the online marketplace service 106. For example, the component may be a stand-alone application, one or more application plug-ins, and/or a browser extension. However, the users may also interact with the online marketplace service 106 via a third-party application, such as a web browser, that resides on the client devices 102 and 104 and is configured to communicate with the online marketplace service 106. In either case, the client-side application presents a user interface (UI) for the user to interact with the online marketplace service 106. For example, the user interacts with the online marketplace service 106 via a client-side application integrated with the file system or via a webpage displayed using a web browser application.

The online marketplace service 106 is one or more computing devices configured to facilitate an online marketplace (e.g., EBAY, AMAZON, etc.) in which users may post items for sale and purchase items posted for sale by other users. For example, the online marketplace service 106 provides a user interface in which users may view item listings posted to the online marketplace service 106. Each item listing provides details for an item or items listed for sale. For example, the item listing may include an item description, images, sale price, current bid price, auction time remaining, etc.

The online marketplace service 106 may further provide functionality that enables a user to purchase and/or bid on an item. For example, the online marketplace service 106 may provide user interface elements (e.g., button, text fields, etc.) that a user may use to select purchase an item, place a bid, etc., as well as provide their financial (e.g., credit card number, bank account number) and personal information (e.g., shipping address, billing address, etc.) to complete the purchase.

To list an item for sale on the online marketplace, a user creates a user account with the online marketplace service 106. The user account may include the user's personal information (e.g., name, address, email address, phone number, etc.) and financial information (e.g., credit card information, bank account information, etc.). Once the user has created a user account, the user may then use their user account to utilize the functionality of the online marketplace service 106, including listing an item for sale on the online marketplace. The online marketplace service 106 provides users with a listing interface that enables a user to create a new listing as well as provide data for the listing. For example, the listing interface may include data fields that prompt the user to provide specified information for the listing, such as the price, description, etc. The listing interface may also include user interface elements, such as buttons, that enable the user to submit and/or post a completed listing. That is, the user may post the listing after the user has filled in the data fields included in the listing interface.

In some embodiments, the online marketplace service 106 may require that certain data be provided prior to a listing being posted on the online marketplace. That is, the online marketplace service 106 may not allow a listing to be posted if certain information has not been entered by the user, such as a sale price or item description. The online marketplace service 106 may also allow users to save a listing prior to completion. That is, the online marketplace service 106 allows a user to begin creating a listing and save the listing prior to posting the listing. The user may then login to their account with the online marketplace service 108 at a later time to complete the listing (e.g., provide additional data) and post the listing to the online marketplace.

Some users do not complete the process of posting a listing for sale. That is, a user may begin creating a posting, but does not complete the process for one or more reasons. For example, the user may perceive the process as taking too long, believe that the potential profit is not worth the trouble of completing listing, or simply forget to finish the process. To increase the likelihood that users complete uncompleted listing, the online marketplace service 106 utilizes the functionality of the draft completion system 108 to presents users with incentivizing notifications. An incentivizing notification is a notification that notifies a user of a determined incentivizing reason for completing the uncompleted listing. For example, the incentivizing notification may notify the user that the listing is almost ready to be posted (e.g., only a few pieces of information need to be added), that the listing is ready to be posted (e.g., a sufficient amount of information has been provided), an expected amount to be earned from sale of the item, that the item is currently in high demand and will likely sell quickly, that the listing is associated with a current promotion, and the like.

The incentivizing notification may be presented in a user interface window that allows the user to easily and quickly complete the uncompleted listing. For example, the user interface window may include text fields that allow the user to provide any information that is needed to complete the listing and/or a button that allows the user to post the listing. The user can complete the listing without having to navigate to another webpage, thereby increasing the likelihood that the user will complete the listing.

The online marketplace system 106 transmits a request to the draft completion service 108 to generate incentivizing notifications. The request may include data identifying a user account of the online marketplace system 106 and/or data identifying any uncompleted listings. The online marketplace system 106 may transmit the request in response to a user logging into their user account with the online marketplace system 106. As another example, the online marketplace system 106 transmits the request upon detecting that an uncompleted listing has remained incomplete for a threshold period of time.

The draft completion system 108 is one or more computing device configured to generate and cause presentation of incentivizing notifications. Although the draft completion system 108 is shown as being separate from the online marketplace service 106, this is just one example and is not meant to be limiting. The draft completion system 108 may be implemented, either partially or completely, as part of the online marketplace service 106.

The draft completion system 108 gathers data from the online marketplace service 106 to generate the incentivizing notifications. The data may include data associated with the uncompleted listing, such as data identifying an item listed for sale, data fields that remain incomplete, data fields that have been completed, etc. The data may also include sales data associated with the item, such as prices at which the item was previously sold, amount of time it took for the item to sell, how many similar items are listed, etc.

The draft completion system 108 uses the gathered data to determine a set of status values for the uncompleted listing. Each status value provides information regarding the uncompleted listing, such as a completion percentage of the uncompleted listing, an expected number of days for the item to sell, an expected sale price of the item, promotions associated with the item, etc. The draft completion system 108 uses the determined status values to generate incentivizing notifications to present the user. The incentivizing notification notifies the user of the determined status values to incentivize the user to complete the listing. For example, the incentivizing notification notifies the user that the listing will sell quickly and for a high price. As another example, the incentivizing notification notifies the user that sufficient information has been provided to submit the listing, or that only a limited amount of data is still required to submit the listing.

As explained earlier, the incentivizing notification may be presented in a user interface window that allows the user to easily and quickly complete the uncompleted listing. For example, the user interface window may include text fields that allow the user to provide any information that is needed to complete the listing and/or a button that allows the user to post the listing. The user can complete the listing without having to navigate to another webpage, thereby increasing the likelihood that the user will complete the listing.

Figure 2:
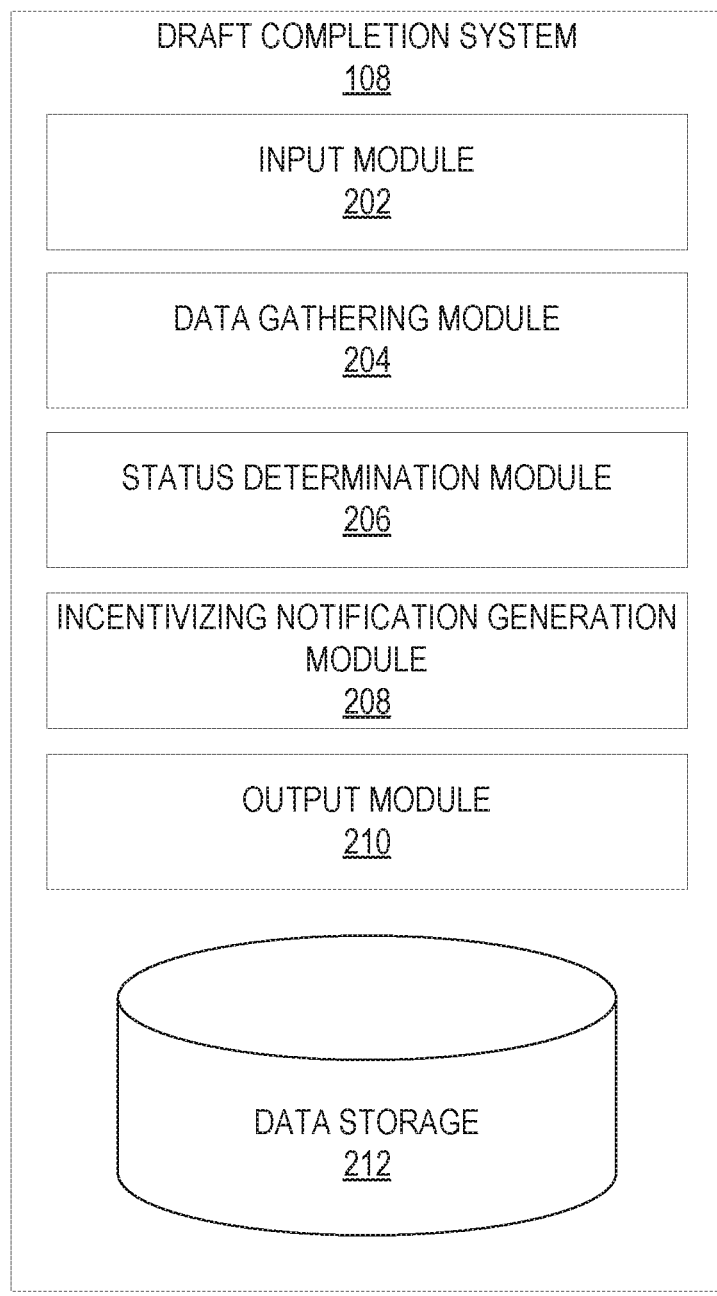
FIG. 2 is a block diagram of the draft completion system, according to some example embodiments.

FIG. 2 is a block diagram of the draft completion system 108, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the draft completion system 108 to facilitate additional functionality that is not specifically described herein. Furthermore, the various functional modules depicted in FIG. 2 may reside on a single computing device or may be distributed across several computing devices in various arrangements such as those used in cloud-based architectures. For example, the various functional modules and components may be distributed amongst computing devices that facilitate both the draft completion system 108 and the online marketplace service 106.

As shown, the draft completion system 108 includes, an input module 202, a data gathering module 204, a status determination module 206, an incentivizing notification generation module 208, an output module 210, and a data storage 212.

The input module 202 receives an input from the online marketplace service 106 to generate incentivizing notifications. The online marketplace service 106 may transmit the input in response to determining that a user that has an uncompleted listing has logged into their account with the online marketplace service 106. As another example, the online marketplace service 106 may transmit the input in response to determining that a listing has remained uncompleted for a threshold period of time. For example, the online marketplace service 106 may transmit the input in response to determining that the listing has remained uncompleted for 2 days. In some embodiments, the input module 202 transmits the input in response to determining that the uncompleted listing is nearing an expiration time. The online marketplace service 106 may enforce an expiration time with uncompleted listing, after which the uncompleted listing is deleted if it has not been completed. The input module 202 may transmit the input in response to determining that a threshold has been met in relation to the expiration time. For example, the input module 202 may transmit the input in response to determining that there is only 1 day left until the expiration time of the uncompleted listing.

The input received by the input module 202 from the online marketplace service 106 includes data identifying a user account and/or an uncompleted listing of the online marketplace 106. For example, the input may include a unique account identifier associated with the user account and/or a unique listing identifier assigned to the uncompleted listing.

The data gathering module 204 gathers data used to generate incentivizing notifications. The data gathering module 204 gathers the data from the data storage 212. The data storage maintains user profile data for the online marketplace service 106, as well as listing and historical sale data for the online marketplace service 106.

The data gathering module 204 uses the data received by the input module 202 to gather data from the data storage 212. For example, the data gathering module 204 uses the included account identifier and/or the listing identifiers to identify and access the corresponding user account and uncompleted listings. The data gathering module 204 gathers data from the uncompleted listing, such as the item listed for sale, which data fields have been completed, which data fields remain incomplete, etc. The data gathering module 204 may use this gathered data to gather other listing data and historical sales data. For example, the data gathering module 204 may gather listing data for other listings selling the same or similar item. As another example, the data gathering module 204 may gather historical sales data for the same or similar item. The historical sales data includes the sale price of the item, the number of days the listing was posted prior to sale, etc. The data gathering module 204 provides the gathered data to the other modules of the draft completion system 108.

The status determination module 206 uses the data gathered by the data gathering module 204 to determine a set of status values for the uncompleted listing. Each status value provides information regarding the uncompleted listing, such as a completion percentage of the uncompleted listing, an expected number of days for the item to sell, an expected sale price of the item, promotions associated with the item, etc.

The status determination module 206 determines the status values using sets of status determination rules that dictate what data should be accessed to determine the status values and how data is used to determine the status values. For example, a set of status determination rule for determining the completion percentage of the uncompleted listing (e.g., how close the listing is to meeting a threshold amount of data for the uncompleted listing to be eligible to be submitted to the online marketplace) may include gathering data identifying the data fields from the listing that have been completed, determining which data fields are required to be filled to meet the threshold amount of data, and calculating the completion percentage based on the number of the data fields required to meet the threshold that have been filled or unfilled.

As another example, the set of status determination rules for determining an expected sale price may include determining the item listed for sale in the uncompleted listing, gathering historical sale data for the completed listings for the same item, and calculating an average based on the sale prices from the gathered historical sale data. As another example, the set of status determination rules for determining an expected time to sell the item may include determining the item listed for sale in the uncompleted listing, gathering historical sale data for the completed listings for the same item, and calculating an average number of days to sale from the gathered historical sale data.

As another example, the set of status determination rules for determining if there are any available promotions associated with listing the item may include determining the item listed for sale in the uncompleted listing and determining whether a listing of available promotions includes a promotion associated with the item.

In some embodiments the status value may indicate an aggregated status determined from multiple uncompleted listings. For example, the status value may indicate an expected aggregate sale price from listing multiple uncompleted listings. The set of status determination rules for determining the expected aggregate sale price may include determining the items listed for sale in each of the uncompleted listings, gathering historical sale data for the completed listings for the same items, calculating an average sale price for each of the items based on the sale prices from the gathered historical sale data, and calculating an expected aggregated sales price based on the determined average sale price for each of the items.

These are just a few examples of status determination rules and are not meant to be limiting. The status determination module 206 may have access to any number of status determination rules to generate a variety of status values.

The incentivizing notification generation module 208 generates incentivizing notifications based on the status values determined by the status determination module 206. An incentivizing notification is a message or other notification that is meant to incentivize the user to complete an uncompleted listing. The incentivizing notification may incentivize the user by presenting the user with status values that are favorable or otherwise might incentivize the user to complete the uncompleted listing. For example, the incentivizing notification may indicate that the user has already provided adequate information to post the listing or has provide close to enough information to post the listing. As another example, the incentivizing notification may indicate the expected sale price of the item if uncompleted listing is completed, or the aggregated expected sale price if multiple uncompleted listings are completed. As another example, the incentivizing notification may indicate an active promotion associated with listing the item.

To further incentivize the user to complete an uncompleted listing, the incentivizing notification may include user interface elements, such as text boxes, buttons, etc., that enable the user to complete and post the uncompleted listing directly from the incentivizing notification. This eliminates the need for the user to have to navigate to another webpage to complete the uncompleted listing.

To generate the incentivizing notification, the incentivizing notification generation module 208 selects one or more status values to include in the incentivizing notification. The selection may be based on the status values that are determined to be most favorable or incentivizing for completing the uncompleted listing. For example, the incentivizing notification generation module 208 may compare the status values to threshold values and select the status value that exceeds the threshold by the greatest amount. Accordingly, the incentivizing notification generation module 208 may select a status value indicating an expected time to sell the item over the status value indicating an expected sale price of the item if the expected sale time is much faster than an average, whereas the expected sale price is about average or not greatly exceeding an average.

In some embodiments, the incentivizing notification generation module 208 may maintain a ranking of the status values indicating a predetermined ranking of how influential the status values are at incentivizing a user to complete an uncompleted listing. The incentivizing notification generation module 208 may select the status values using the ranking based on whether the status value exceeds a predetermined threshold. That is, the incentivizing notification generation module 208 determines the status values that exceed predetermined thresholds and then selects a subset of the status values that do exceed the predetermined thresholds based on the ranking.

Once the incentivizing notification generation module 208 has selected the status values, the incentivizing notification generation module 208 generates the incentivizing notification based on the selected status values. That is, the incentivizing notification generation module 208 generates text messages and/or graphics (e.g., graphs, infographic, etc.) that notify the user of the status value to incentivize the user to complete the uncompleted listing. For example, the incentivizing notification may include a completion bar or graph that shows the user how close the uncompleted listing is to being completed. As another example, the incentivizing notification may include text describing an incentive or promotion associated with completing the listing.

The incentivizing notification generation module 208 also determines the appropriate user interface elements to include in the incentivizing notification. For example, if the uncompleted listing requires additional data fields, the incentivizing notification generation module 208 may include user interface elements to provide those additional data fields.

The incentivizing notification may also include a button that a user may select to post the uncompleted listing to the online marketplace.

The output module 210 provides the generated incentivizing notification to the appropriate user. For example, the output module 210 may cause the incentivizing notification to be presented on a client device 102 of the user within the online marketplace service. That is, the user will be shown the incentivizing notification when logged into and using the online marketplace service. The output module 210 can be accomplish this by transmitting the incentivizing notification directly to the user's client device 102 or transmitting the incentivizing notification to the online marketplace service 106, which then causes the incentivizing notification to be presented on the user's client device. The output module 210 may also transmit to the incentivizing notification to the user using other communication channels, such as email, text, etc.

Figure 3A:
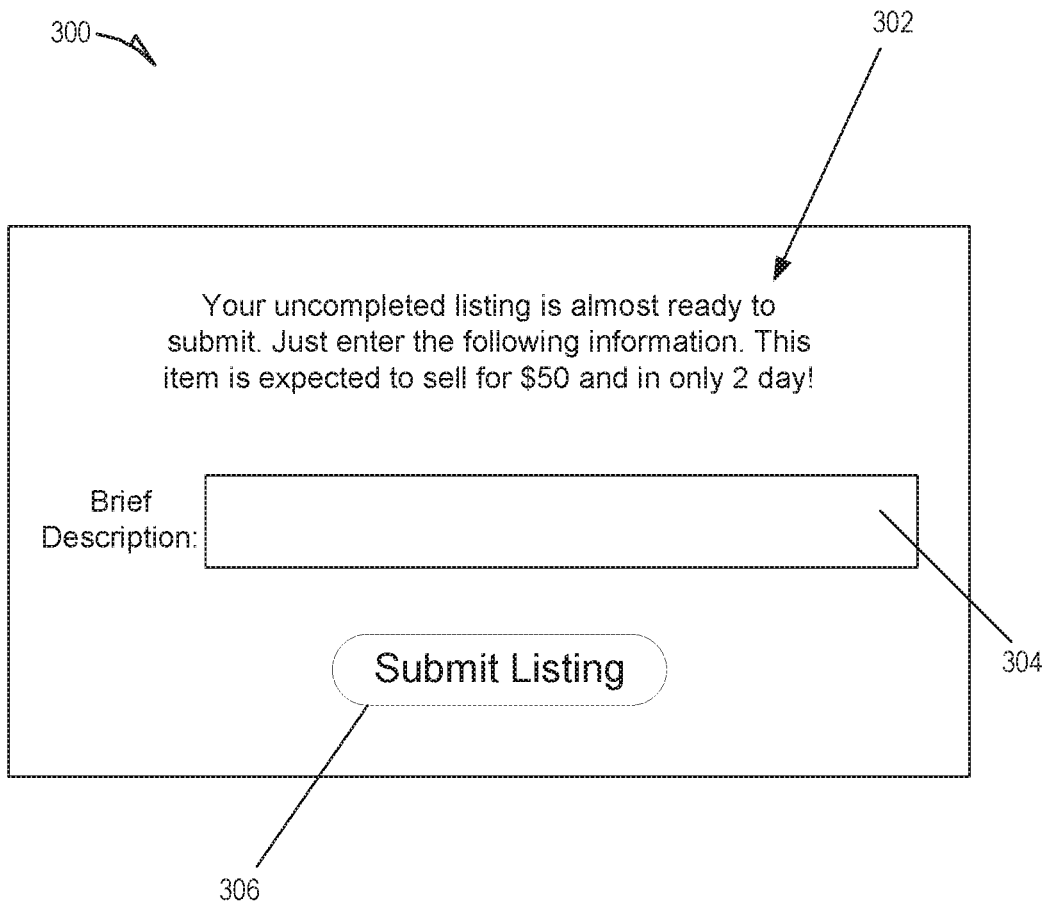
FIGS. 3A-3C show examples of incentivizing notifications, according to some example embodiments.
Figure 3B:
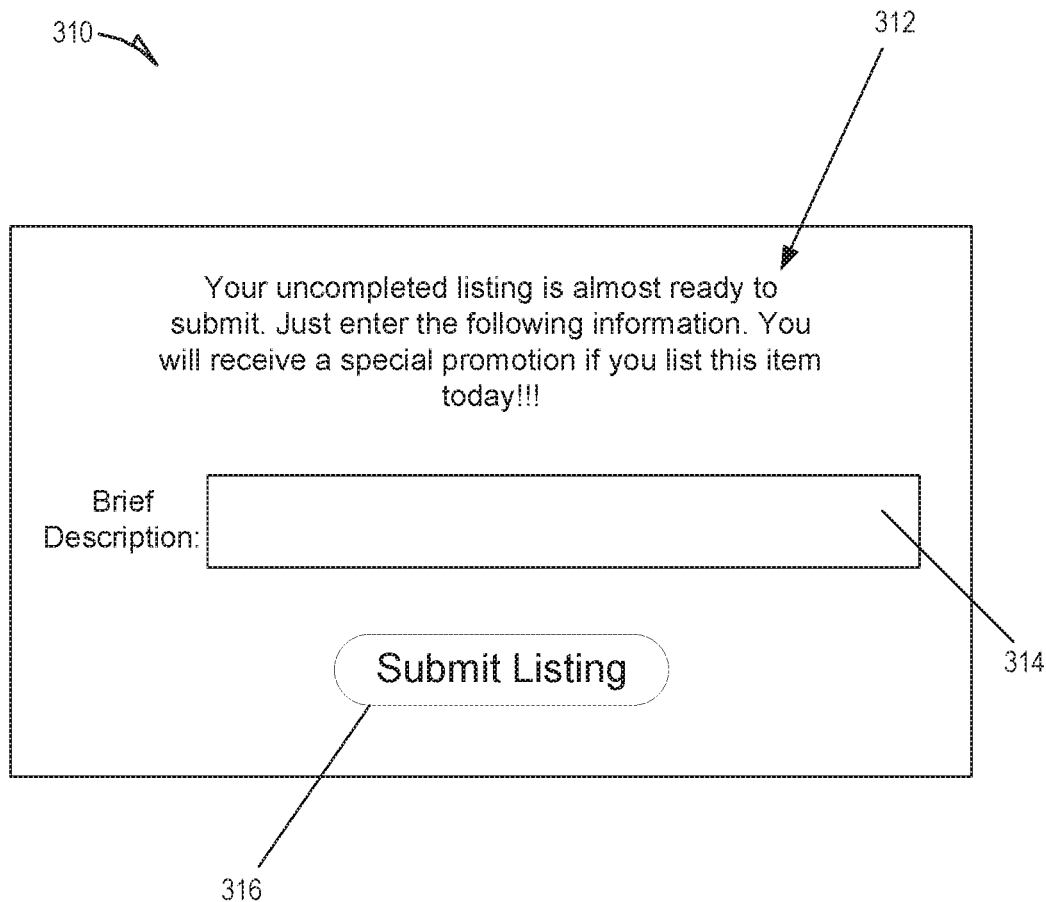
Figure 3C:

FIGS. 3A-3C show examples of incentivizing notifications, according to some example embodiments. FIG. 3A is an incentivizing notification 300 that incentivizes a user to complete an uncompleted listing. As shown, the incentivizing notification 300 includes a text portion 302 that notifies the user of several status values of the uncompleted listing. Specifically, the text portion 302 notifies the user that the uncompleted listing is almost ready to submit, that the item is expected to sell for $50, and the item is expected to sell in two days. The incentivizing notification 300 also includes a text field 304 that allows a user to enter the information needed to complete the listing. The incentivizing notification 300 also includes a button 306 that the user may select to submit the listing after the user has provided the remaining information into the text field 304.

FIG. 3B is another incentivizing notification 310 that incentivizes a user to complete an uncompleted listing. As shown, the incentivizing notification 310 includes a text portion 312 that notifies the user of several status values of the uncompleted listing. Specifically, the text portion 312 notifies the user that the uncompleted listing is almost ready to submit and that the user will receive a special promotion if the item is listed that same day. The incentivizing notification 310 also includes a text field 314 that allows a user to enter the information needed to complete the listing. The incentivizing notification 310 also includes a button 316 that the user may select to submit the listing after the user has provided the remaining information into the text field 314.

FIG. 3C is another incentivizing notification 320 that incentivizes a user to complete an uncompleted listing. As shown, the incentivizing notification 320 includes a text portion 322 that notifies the user of several status values of the uncompleted listing. Specifically, the text portion 322 notifies the user that the uncompleted listing is already ready to submit and that the user will receive a special promotion if the item is listed that same day. The incentivizing notification 320 also includes a button 324 that the user may select to submit the listing.

Figure 4:
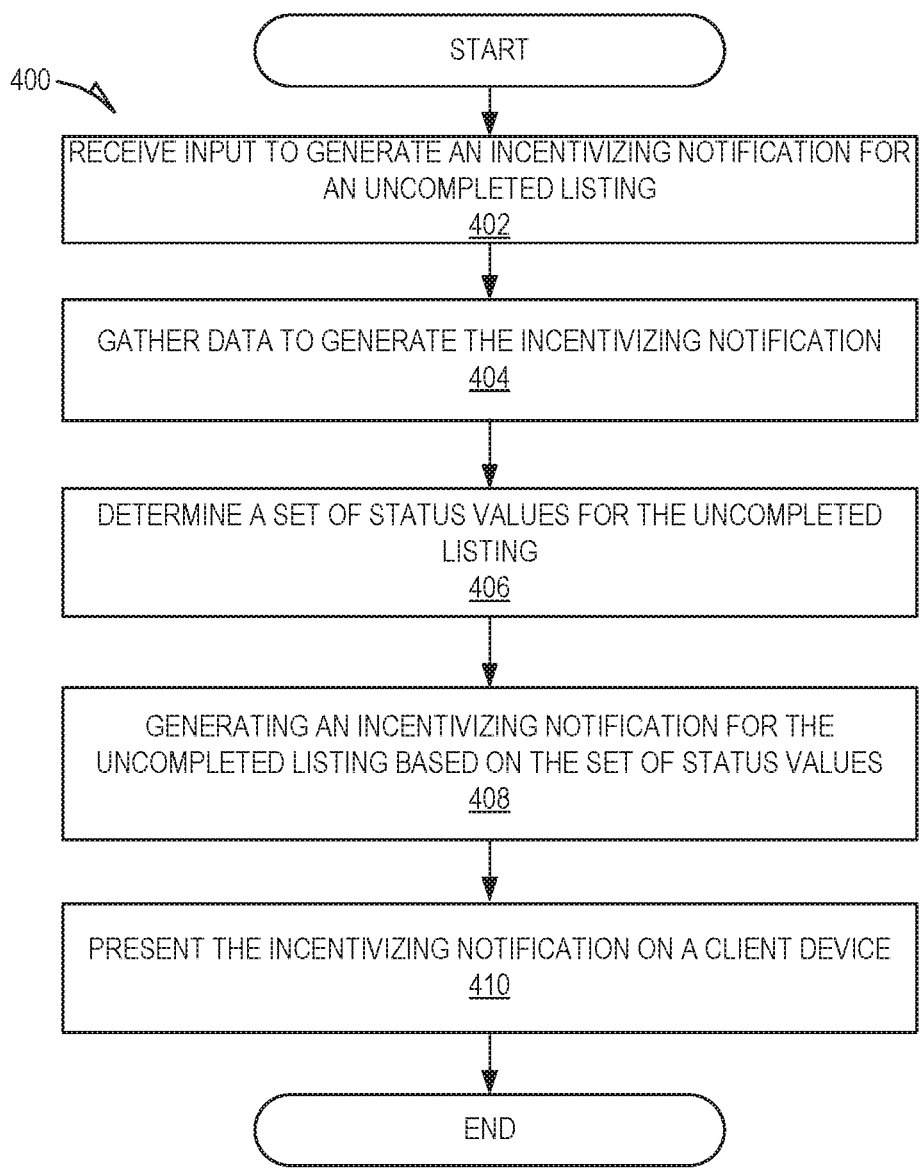
FIG. 4 is a flowchart showing an example method of generating incentivizing notifications to complete an uncompleted listing, according to certain example embodiments.

FIG. 4 is a flowchart showing an example method 400 of generating incentivizing notifications to complete an uncompleted listing, according to certain example embodiments. The method 400 may be embodied in computer readable instructions for execution by one or more processors such that the operations of the method 400 may be performed in part or in whole by the draft completion system 108; accordingly, the method 400 is described below by way of example with reference thereto. However, it shall be appreciated that at least some of the operations of the method 400 may be deployed on various other hardware configurations and the method 400 is not intended to be limited to the draft completion system 108.

At operation 402, the input module 202 receives an input to generate an incentivizing notification for an uncompleted listing. The input may be received by the input module 202 from the online marketplace service 106. The online marketplace service 106 transmits the input in response to determining that a user that has an uncompleted listing has logged into their account with the online marketplace service 106. As another example, the online marketplace service 106 transmits the input in response to determining that a listing has remained uncompleted for a threshold period of time. For example, the online marketplace service 106 may transmit the input in response to determining that the listing has remained uncompleted for 2 days. In some embodiments, the input module 202 transmits the input in response to determining that the uncompleted listing is nearing an expiration time. The online marketplace service 106 may enforce an expiration time with uncompleted listing, after which the uncompleted listing is deleted if it has not been completed. The input module 202 may transmit the input in response to determining that a threshold has been met in relation to the expiration time. For example, the input module 202 may transmit the input in response to determining that there is only 1 day left until the expiration time of the uncompleted listing.

The input received by the input module 202 from the online marketplace service 106 includes data identifying a user account and/or an uncompleted listing of the online marketplace 106. For example, the input may include a unique account identifier associated with the user account and/or a unique listing identifier assigned to the uncompleted listing.

At operation 404, the data gathering module 204 gathers data to generate the incentivizing notification. The data gathering module 204 gathers the data from the data storage 212. The data storage maintains user profile data for the online marketplace service 106, as well as listing and historical sale data for the online marketplace service 106.

The data gathering module 204 uses the data received by the input module 202 to gather data from the data storage 212. For example, the data gathering module 204 uses the included account identifier and/or the listing identifiers to identify and access the corresponding user account and uncompleted listings. The data gathering module 204 gathers data from the uncompleted listing, such as the item listed for sale, which data fields have been completed, which data fields remain incomplete, etc. The data gathering module 204 may use this gathered data to gather other listing data and historical sales data. For example, the data gathering module 204 may gather listing data for other listings selling the same or similar item. As another example, the data gathering module 204 may gather historical sales data for the same or similar item. The historical sales data includes the sale price of the item, the number of days the listing was posted prior to sale, etc. The data gathering module 204 provides the gathered data to the other modules of the draft completion system 108.

At operation 406, the status determination module 206 determines a set of status values for the uncompleted listing. Each status value provides information regarding the uncompleted listing, such as a completion percentage of the uncompleted listing, an expected number of days for the item to sell, an expected sale price of the item, promotions associated with the item, etc.

The status determination module 206 determines the status values using sets of status determination rules that dictate what data should be accessed to determine the status values and how data is used to determine the status values. For example, a set of status determination rule for determining the completion percentage of the uncompleted listing (e.g., how close the listing is to meeting a threshold amount of data for the uncompleted listing to be eligible to be submitted to the online marketplace) may include gathering data identifying the data fields from the listing that have been completed, determining which data fields are required to be filled to meet the threshold amount of data, and calculating the completion percentage based on the number of the data fields required to meet the threshold that have been filled or unfilled.

As another example, the set of status determination rules for determining an expected sale price may include determining the item listed for sale in the uncompleted listing, gathering historical sale data for the completed listings for the same item, and calculating an average based on the sale prices from the gathered historical sale data. As another example, the set of status determination rules for determining an expected time to sell the item may include determining the item listed for sale in the uncompleted listing, gathering historical sale data for the completed listings for the same item, and calculating an average number of days to sale from the gathered historical sale data.

As another example, the set of status determination rules for determining if there are any available promotions associated with listing the item may include determining the item listed for sale in the uncompleted listing and determining whether a listing of available promotions includes a promotion associated with the item.

In some embodiments the status value may indicate an aggregated status determined from multiple uncompleted listings. For example, the status value may indicate an expected aggregate sale price from listing multiple uncompleted listings. The set of status determination rules for determining the expected aggregate sale price may include determining the items listed for sale in each of the uncompleted listings, gathering historical sale data for the completed listings for the same items, calculating an average sale price for each of the items based on the sale prices from the gathered historical sale data, and calculating an expected aggregated sales price based on the determined average sale price for each of the items.

These are just a few examples of status determination rules and are not meant to be limiting. The status determination module 206 may have access to any number of status determination rules to generate a variety of status values.

At operation 408, the incentivizing notification generation module 208 generates an incentivizing notification for the uncompleted listing based on the set of status values. An incentivizing notification is a message or other notification that is meant to incentivize the user to complete an uncompleted listing. The incentivizing notification may incentivize the user by presenting the user with status values that are favorable or otherwise might incentivize the user to complete the uncompleted listing. For example, the incentivizing notification may indicate that the user has already provided adequate information to post the listing or has provide close to enough information to post the listing. As another example, the incentivizing notification may indicate the expected sale price of the item if uncompleted listing is completed, or the aggregated expected sale price if multiple uncompleted listings are completed. As another example, the incentivizing notification may indicate an active promotion associated with listing the item.

To further incentivize the user to complete an uncompleted listing, the incentivizing notification may include user interface elements, such as text boxes, buttons, etc., that enable the user to complete and post the uncompleted listing directly from the incentivizing notification. This eliminates the need for the user to have to navigate to another webpage to complete the uncompleted listing.

To generate the incentivizing notification, the incentivizing notification generation module 208 selects one or more status values to include in the incentivizing notification. The selection may be based on the status values that are determined to be most favorable or incentivizing for completing the uncompleted listing. For example, the incentivizing notification generation module 208 may compare the status values to threshold values and select the status value that exceeds the threshold by the greatest amount. Accordingly, the incentivizing notification generation module 208 may select a status value indicating an expected time to sell the item over the status value indicating an expected sale price of the item if the expected sale time is much faster than an average, whereas the expected sale price is about average or not greatly exceeding an average.

In some embodiments, the incentivizing notification generation module 208 may maintain a ranking of the status values indicating a predetermined ranking of how influential the status values are at incentivizing a user to complete an uncompleted listing. The incentivizing notification generation module 208 may select the status values using the ranking based on whether the status value exceeds a predetermined threshold. That is, the incentivizing notification generation module 208 determines the status values that exceed predetermined thresholds and then selects a subset of the status values that do exceed the predetermined thresholds based on the ranking.

Once the incentivizing notification generation module 208 has selected the status values, the incentivizing notification generation module 208 generates the incentivizing notification based on the selected status values. That is, the incentivizing notification generation module 208 generates text messages and/or graphics (e.g., graphs, infographic, etc.) that notify the user of the status value to incentivize the user to complete the uncompleted listing. For example, the incentivizing notification may include a completion bar or graph that shows the user how close the uncompleted listing is to being completed. As another example, the incentivizing notification may include text describing an incentive or promotion associated with completing the listing.

The incentivizing notification generation module 208 also determines the appropriate user interface elements to include in the incentivizing notification. For example, if the uncompleted listing requires additional data fields, the incentivizing notification generation module 208 may include user interface elements to provide those additional data fields. The incentivizing notification may also include a button that a user may select to post the uncompleted listing to the online marketplace.

At operation 410, the output module 210 presents the incentivizing notification on a client device 102. For example, the output module 210 may cause the incentivizing notification to be presented within the online marketplace service on a client device 102 of the user. That is, the user will be shown the incentivizing notification when logged into and using the online marketplace service. The output module 210 can be accomplish this by transmitting the incentivizing notification directly to the user's client device 102 or transmitting the incentivizing notification to the online marketplace service 106, which then causes the incentivizing notification to be presented on the user's client device. The output module 210 may also transmit to the incentivizing notification to the user's client device 102 using other communication channels, such as email, text, etc.

Figure 5:
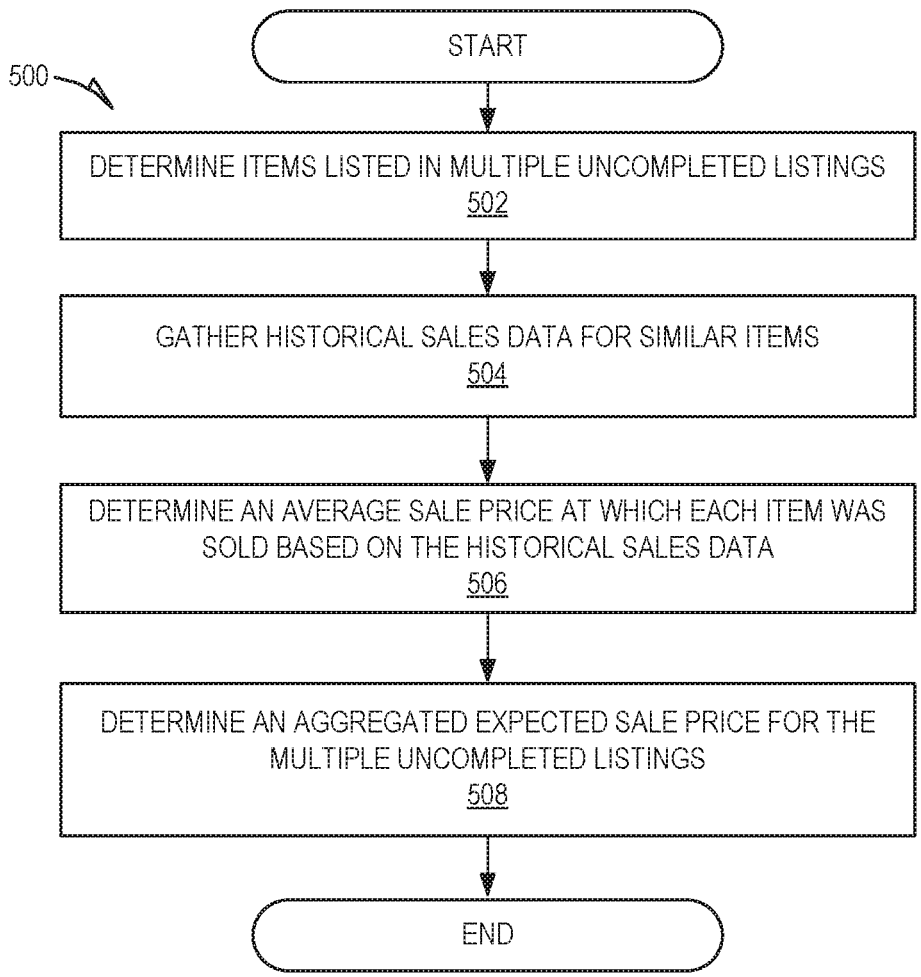
FIG. 5 is a flowchart showing an example method of generating an in similarity matrix, according to certain example embodiments.

FIG. 5 is a flowchart showing an example method 500 of generating an aggregated status value based on multiple uncompleted listings, according to certain example embodiments. The method 500 may be embodied in computer readable instructions for execution by one or more processors such that the operations of the method 500 may be performed in part or in whole by the draft completion system 108; accordingly, the method 500 is described below by way of example with reference thereto. However, it shall be appreciated that at least some of the operations of the method 500 may be deployed on various other hardware configurations and the method 500 is not intended to be limited to the draft completion system 108.

At operation 502, the data gathering module 204 determines items listed in multiple uncompleted listings. For example, the data gathering module 204 may be provided with listing identifiers for the uncompleted listings by the input module 202. The data gathering module 204 uses the listing identifiers to access the uncompleted listings in the data storage 212. The data gathering module 204 determines the items listed in each uncompleted listing from the data in the data storage 212.

At operation 504, the data gathering module 204 gathers historical sales data for similar items. The data gathering module 204 uses the determined items listed in the uncompleted listings to search the historical sales data in the data storage 212 for sales data for similar items. A similar item is an item that is predetermined as being similar enough to the item to provide an accurate idea of the expected sale price of the item. For example, a similar item may be the same item (e.g., guitar, automobile, etc.), but manufactured in a slightly different year (e.g., within 2 years of the item). The data gathering module 204 may include a listing of similar items that is used to determine which items are similar. If an item is not associated with similar items, the data gathering module 204 may limit the search to historical sales data for the same item. The historical sales data includes a completed sale price at which the similar items were sold in the historical listings.

At operation 506, the status determination module 208 determines an average sale price at which each item was sold based on the historical sales data. The status determination module 208 uses the sale prices from the historical sales data for each item to determine an average sale price for the item.

At operation 508, the status determination module 208 determines an aggregated expected sale price for the multiple uncompleted listings. The status determination module 208 determines the aggregated expected sale price by determining the sum of the average sale price for each item.

Software Architecture

Figure 6:
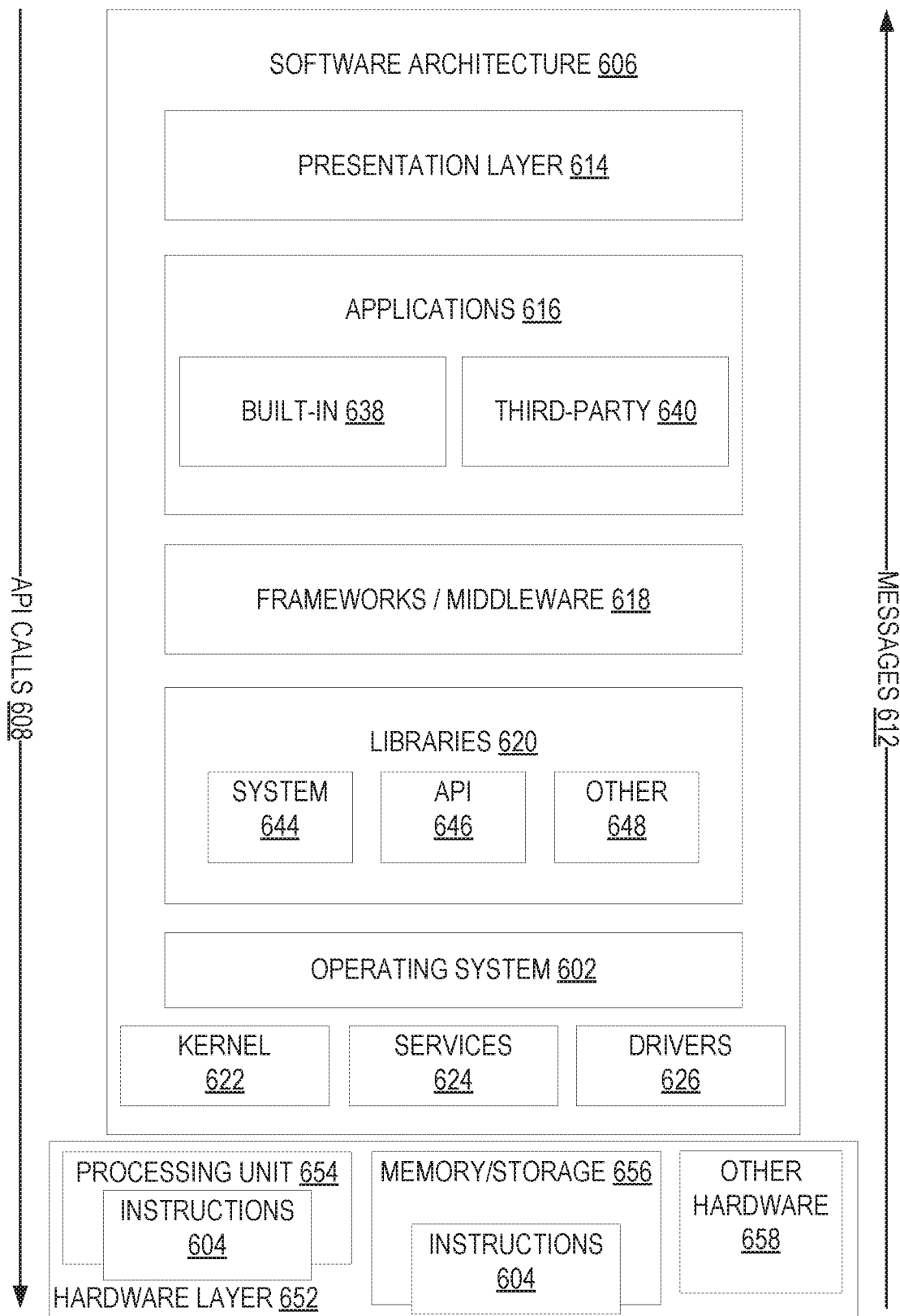
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 700 of FIG. 7 that includes, among other things, processors 704, memory 714, and (input/output) I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke Application Programming Interface (API) calls 608 through the software stack and receive a response such as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphical user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
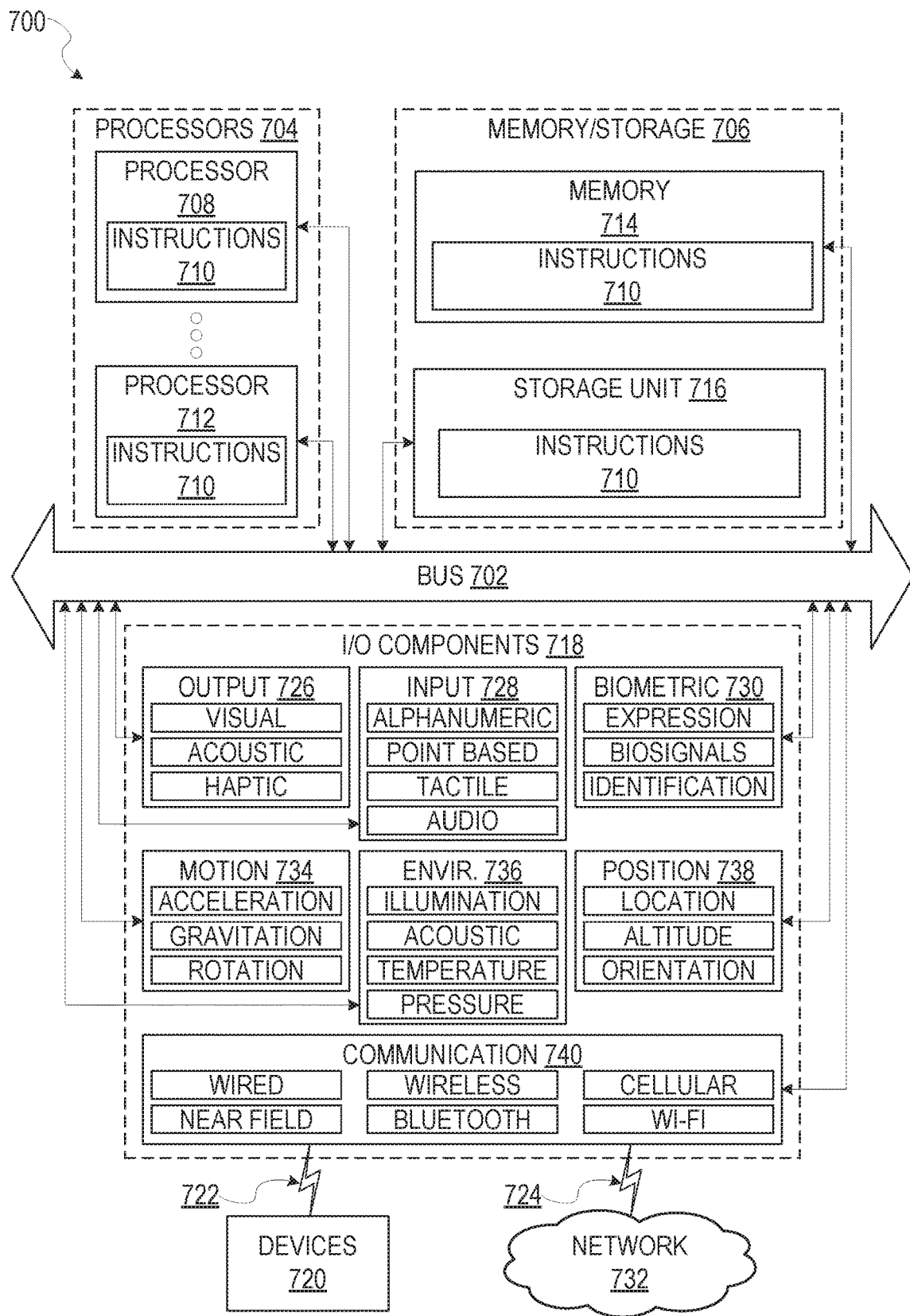
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 604 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 710 for execution by the machine 700, and includes digital or analog communications signals or other intangible medium to facilitate communication of such instructions 710. Instructions 710 may be transmitted or received over the network 732 using a transmission medium via a network interface device and using any one of a number of well-known transfer protocols.

"CLIENT DEVICE" in this context refers to any machine 700 that interfaces to a communications network 732 to obtain resources from one or more server systems or other client devices. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 732 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 732 or a portion of a network 732 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 704 or other programmable processor 704. Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an API). The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 704 (sometimes referred to as "cores") that may execute instructions 710 contemporaneously.

What is claimed is:

1. A method comprising:
   determining, based on data included in an uncompleted listing for an item, a set of status values for the uncompleted listing, the data having been provided via a first user interface for posting listings to an online marketplace, the uncompleted listing being associated with a first account of an online service, wherein determining the set of status values comprises:
      determining a number of uncompleted data fields from the uncompleted listing that are needed to complete the uncompleted listing;

determining, based on the number of uncompleted data fields, a completion value for the uncompleted listing, the completion value indicating an amount of information needed to complete the uncompleted listing; and determining, based on the item listed in the uncompleted listing, that there is a current promotion being offered in relation to the item for completion of the uncompleted listing;

generating, based on the set of status values, a first incentivizing notification for the uncompleted listing, the first incentivizing notification including the completion value and identifying the current promotion;

presenting, on a client device associated with the first account, a second user interface including the first incentivizing notification and at least one user interface element that enables a user to complete the uncompleted listing from the second user interface without having to navigate to another webpage, the second user interface being different than the first user interface;

receiving, from the client device, a communication to post a completed listing based on the uncompleted listing and data included in the communication, the communication initiated using the at least one user interface element included in the second user interface;

posting the completed listing to an online marketplace based on the communication to post the completed listing; and providing the current promotion to a user associated with the first account of an online service based on posting the completed listing to the online marketplace.

2. The method of claim 1, wherein the at least one user interface element enables the user to provide information for at least one uncompleted data field.

3. The method of claim 1, wherein determining the first a set of status values comprises: determining, based on historical sale data, an average sale price for the item, wherein the first incentivizing notification indicates the average sale price for the item.

4. The method of claim 1, wherein determining the first a set of status values comprises: determining, based on historical sale data, an average number of days in which previous listings for the item were completed, wherein the first incentivizing notification indicates the average number of days.

5. The method of claim 1, wherein the at least one user interface element enables the user to post the uncompleted listing to an online marketplace.

6. A computing system comprising: one or more computer processors; and one or more computer-readable mediums storing instructions that, when executed by the one or more computer processors, cause the computing system to perform operations comprising:

determining, based on data included in an uncompleted listing for an item, a set of status values for the uncompleted listing, the data having been provided via a first user interface for posting listings to an online marketplace, the uncompleted listing being associated with a first account of an online service, wherein determining the set of status values comprises:

determining a number of uncompleted data fields from the uncompleted listing that are needed to complete the uncompleted listing;

determining, based on the number of uncompleted data fields, a completion value for the uncompleted listing, the completion value indicating an amount of information needed to complete the uncompleted listing; and determining, based on the item listed in the uncompleted listing, that there is a current promotion being offered in relation to the item for completion of the uncompleted listing;

generating, based on the set of status values, a first incentivizing notification for the uncompleted listing, the first incentivizing notification including the completion value and identifying the current promotion;

presenting, on a client device associated with the first account, a second user interface including the first incentivizing notification and at least one user interface element that enables a user to complete the uncompleted listing from the second user interface without having to navigate to another webpage, the second user interface being different than the first user interface;

receiving, from the client device, a communication to post a completed listing based on the uncompleted listing and data included in the communication, the communication initiated using the at least one user interface element included in the second user interface;

posting the completed listing to an online marketplace based on the communication to post the completed listing; and providing the current promotion to a user associated with the first account of an online service based on posting the completed listing to the online marketplace.

7. The computing system of claim 6, wherein the at least one user interface element enables the user to provide information for at least one uncompleted data field.

8. The computing system of claim 6, wherein determining the first a set of status values comprises: determining, based on historical sale data, an average sale price for the item, wherein the first incentivizing notification indicates the average sale price for the item.

9. The computing system of claim 6, wherein determining the first a set of status values comprises: determining, based on historical sale data, an average number of days in which previous listings for the item were completed, wherein the first incentivizing notification indicates the average number of days.

10. The computing system of claim 6, wherein the at least one user interface element enables the user to post the uncompleted listing to an online marketplace.

11. A non-transitory computer-readable medium storing instructions that, when executed by one or more computer processors of a computing system, cause the computing system to perform operations comprising:

determining, based on data included in an uncompleted listing for an item, a set of status values for the uncompleted listing, the data having been provided via a first user interface for posting listings to an online marketplace, the uncompleted listing being associated with a first account of an online service, wherein determining the set of status values comprises:

determining a number of uncompleted data fields from the uncompleted listing that are needed to complete the uncompleted listing;

determining, based on the number of uncompleted data fields, a completion value for the uncompleted listing, the completion value indicating an amount of information needed to complete the uncompleted listing; and determining, based on the item listed in the uncompleted listing, that there is a current promotion being offered in relation to the item for completion of the uncompleted listing;

generating, based on the set of status values, a first incentivizing notification for the uncompleted listing, the first incentivizing notification including the completion value and identifying the current promotion;

presenting, on a client device associated with the first account, a second user interface including the first incentivizing notification and at least one user interface element that enables a user to complete the uncompleted listing from the second user interface without having to navigate to another webpage, the second user interface being different than the first user interface;

receiving, from the client device, a communication to post a completed listing based on the uncompleted listing and data included in the communication, the communication initiated using the at least one user interface element included in the second user interface;

posting the completed listing to an online marketplace based on the communication to post the completed listing; and providing the current promotion to a user associated with the first account of an online service based on posting the completed listing to the online marketplace.

12. The non-transitory computer-readable medium of claim 11, wherein the first incentivizing notification includes the completion value, and the at least one user interface element enables the user to provide information for at least one uncompleted data field.

13. The non-transitory computer-readable medium of claim 11, wherein determining the first a set of status values comprises: determining, based on historical sale data, an average sale price for the item, wherein the first incentivizing notification indicates the average sale price for the item.

14. The non-transitory computer-readable medium of claim 11, wherein determining the first a set of status values comprises: determining, based on historical sale data, an average number of days in which previous listings for the item were completed, wherein the first incentivizing notification indicates the average number of days.

15. The non-transitory computer-readable medium of claim 11, wherein the at least one user interface element enables the user to post the uncompleted listing to an online marketplace.

* * * * *